United States Patent
Reel et al.

(10) Patent No.: US 10,343,567 B1
(45) Date of Patent: Jul. 9, 2019

(54) SEAT COVERING AND METHOD OF FORMING SAME

(71) Applicant: Honda Motor Co., Ltd., Tokyo (JP)

(72) Inventors: Travis M. Reel, Marysville, OH (US); Ganesh Narayanan, Plain City, OH (US); Joon Young Kim, San Pedro, CA (US); Hyejin Park, Torrance, CA (US); Frank Moburg, Orange, CA (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 15/904,648

(22) Filed: Feb. 26, 2018

Related U.S. Application Data

(60) Provisional application No. 62/616,306, filed on Jan. 11, 2018.

(51) Int. Cl.
*B60N 2/58* (2006.01)
*B68G 7/05* (2006.01)
*D06H 5/00* (2006.01)

(52) U.S. Cl.
CPC ......... *B60N 2/5891* (2013.01); *B60N 2/5883* (2013.01); *B68G 7/05* (2013.01); *D06H 5/00* (2013.01)

(58) Field of Classification Search
CPC ...... B60N 2/58; B60N 2/5891; B60N 2/5883; B60N 2/5642; B60N 2/609
See application file for complete search history.

(56) References Cited

U.S. PATENT DOCUMENTS

| | | | | |
|---|---|---|---|---|
| 2,483,222 | A * | 9/1949 | Moss | B60N 2/38 5/653 |
| 6,886,479 | B1 * | 5/2005 | Hori | B60N 2/5883 112/470.27 |
| 8,522,704 | B2 | 9/2013 | Graham | |
| 2005/0160956 | A1 * | 7/2005 | Guy | B60N 2/5883 112/475.08 |
| 2005/0200166 | A1 * | 9/2005 | Noh | B60N 2/5642 297/180.14 |
| 2006/0255633 | A1 * | 11/2006 | Nelson | B60N 2/42709 297/216.13 |
| 2007/0022931 | A1 * | 2/2007 | Wieczorek | B60N 2/5883 112/475.06 |

(Continued)

FOREIGN PATENT DOCUMENTS

| CH | 342343 A * | 11/1959 | ........... A47C 31/116 |
|---|---|---|---|
| DE | 102011087172 A * | 5/2012 | ........... B60N 2/5833 |

(Continued)

*Primary Examiner* — Timothy J Brindley
(74) *Attorney, Agent, or Firm* — Honda Patents & Technologies North America, LLC; Clifford B Vaterlaus

(57) ABSTRACT

A seat covering for a seat includes a first covering having a first perforation configuration and a second covering having a second perforation configuration. The second perforation configuration terminates to define a region without perforations adjacent to an edge of the second covering. The first covering and the second covering are joined together at a seam, and a line of stitching is provided along the seam in the region without perforations. One embodiment of the seat covering includes the first covering having a narrow width at the front side of the seat bottom. The first covering widens to a greater width at the rear portion of the seat bottom.

14 Claims, 3 Drawing Sheets

(56) References Cited

U.S. PATENT DOCUMENTS

| | | | | |
|---|---|---|---|---|
| 2009/0001783 A1* | 1/2009 | Hazlewood | ............ | B60N 2/5883 |
| | | | | 297/216.1 |
| 2010/0127487 A1* | 5/2010 | Kamo | .................. | B60N 2/5883 |
| | | | | 280/743.1 |
| 2013/0153122 A1* | 6/2013 | Filipp | .................. | B60N 2/5883 |
| | | | | 156/93 |
| 2016/0068088 A1* | 3/2016 | Stevens-Poire' | ......... | B60N 2/58 |
| | | | | 297/228.1 |
| 2016/0318428 A1* | 11/2016 | Hugues | .................... | B60N 2/90 |
| 2016/0375807 A1* | 12/2016 | Kageyama | ........... | B60N 2/5883 |
| | | | | 297/452.61 |
| 2018/0170225 A1* | 6/2018 | Izukawa | .............. | B60N 2/5883 |
| 2018/0178692 A1* | 6/2018 | Zhao | .................... | B60N 2/5657 |
| 2019/0031062 A1* | 1/2019 | Suzuki | .................... | A47C 31/02 |
| 2019/0031063 A1* | 1/2019 | Suzuki | ................. | B60N 2/5883 |

FOREIGN PATENT DOCUMENTS

| | | | | |
|---|---|---|---|---|
| DE | 202014102703 U1 * | 7/2014 | ............. | B68G 11/02 |
| GB | 987862 A * | 3/1965 | ............. | A47C 31/116 |
| WO | WO-8805420 A1 * | 7/1988 | ................ | B60N 2/58 |
| WO | WO-2007031952 A2 * | 3/2007 | ........... | B60N 2/5891 |
| WO | WO-2015114874 A1 * | 8/2015 | ........... | B60N 2/5891 |
| WO | WO-2016136299 A1 * | 9/2016 | ............. | A47C 31/02 |

* cited by examiner

SEAT COVERING AND METHOD OF FORMING SAME

CROSS REFERENCE TO RELATED APPLICATION

This application claims the benefit of U.S. Provisional Patent Application Ser. No. 62/616,306 filed on Jan. 11, 2018, the contents of which are hereby incorporated herein by reference in their entirety.

BACKGROUND

The disclosed subject matter relates to sheet material joining methods and arrangements. More particularly, the disclosed subject matter relates to seats having coverings made of sheet materials joined together to provide benefits and an aesthetically pleasing appearance.

Sheet materials such as leather are commonly used in covering seats. Vehicle seats are sometimes provided with perforated sheet materials to assist in ventilation, heating or cooling. Also, such perforated sheet materials can be used to provide a comfortable seating surface and an aesthetically pleasing appearance.

SUMMARY

In accordance with one embodiment of the present disclosure, a seat is disclosed including a seat bottom having a front side and a top side, and a seat back extending upwardly from a rear portion of the seat bottom. The seat bottom includes a first covering joined at a seam to a second covering. The first covering has a first width at the front side of the seat bottom, and widens to a second width at the rear portion of the seat bottom. Additional embodiments may include the first covering having a first perforation configuration and the second covering having a second perforation configuration. The second perforation configuration may be different from the first perforation configuration.

In accordance with another embodiment of the present disclosure, a seat covering includes a first covering having perforations in a first configuration that extends to an edge of the first covering. The seat covering also includes a second covering having perforations in a second configuration that terminates to define a region without perforations adjacent an edge of the second covering. A seam joins the edge of the first covering to the edge of the second covering. A line of stitching is placed along the seam in the region without perforations.

A further method of producing a seat covering is disclosed that includes providing a first covering having a first perforation configuration, and providing a second covering having a second perforation configuration that is different from the first perforation configuration. The method also includes joining the first covering to the second covering at a seam, and providing a line of stitching along the seam.

BRIEF DESCRIPTION OF THE DRAWINGS

Certain embodiments of the present disclosure will be better understood from the following description taken in conjunction with the accompanying drawings in which.

DETAILED DESCRIPTION OF EXEMPLARY EMBODIMENTS

A few inventive aspects of the disclosed embodiments are explained in detail below with reference to the various figures. Exemplary embodiments are described to illustrate the disclosed subject matter, not to limit its scope, which is defined by the claims. Those of ordinary skill in the art will recognize a number of equivalent variations of the various features provided in the description that follows. Embodiments are hereinafter described in detail in connection with the views and examples of FIGS. 1-5, wherein like numbers indicate the same or corresponding elements throughout the views.

Figure 1:
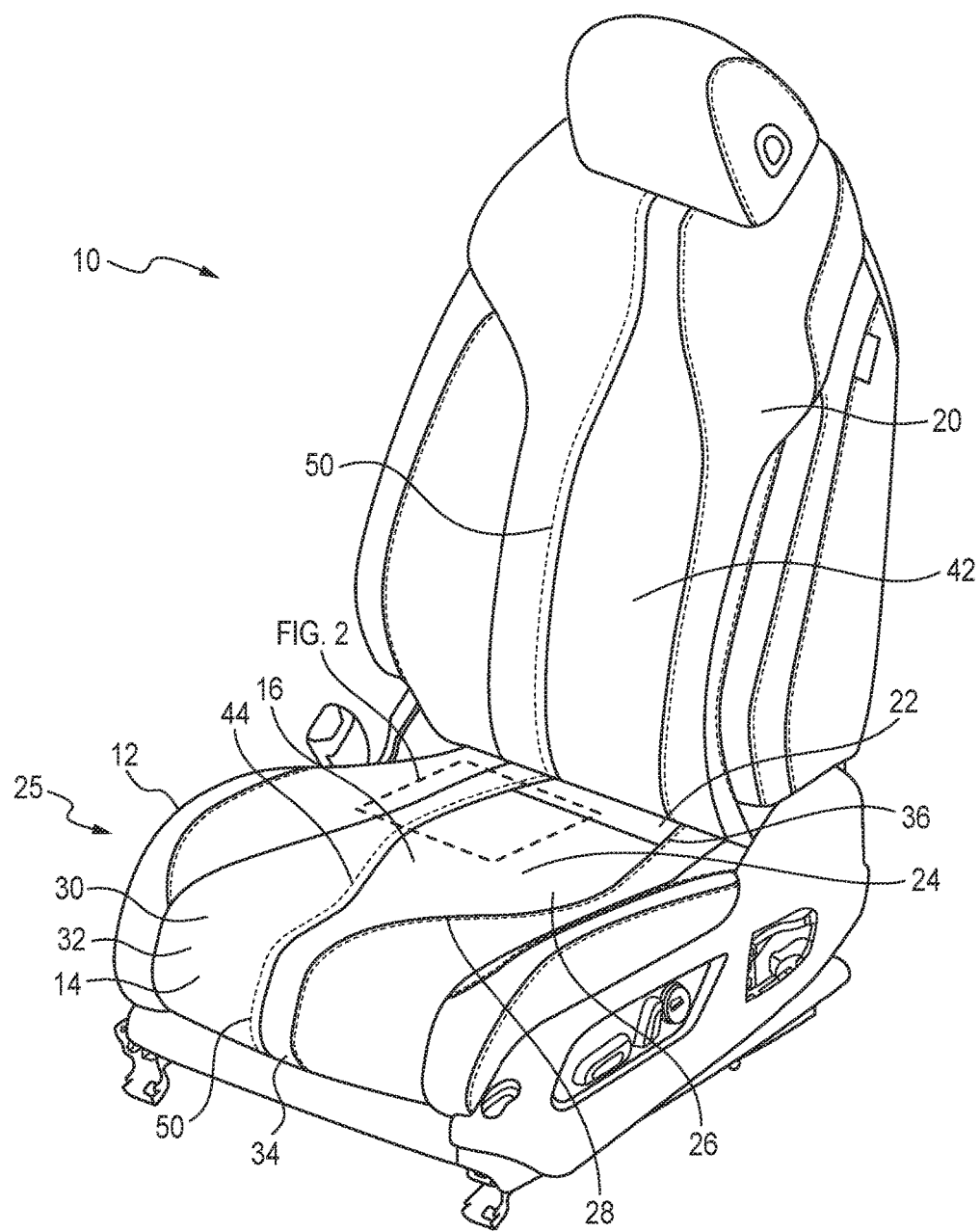
FIG. 1 is a front perspective view depicting a vehicle seat in accordance with one embodiment of the present disclosure.

FIG. 1 illustrates a perspective view of a vehicle seat, indicated generally at 10, in accordance with one embodiment of the present disclosure. The vehicle seat 10 includes a seat bottom 12 having a front side 14 and a top side 16. The seat 10 also includes a seat back 20 extending upwardly from a rear portion 22 of the seat bottom 12. The seat back 20 may be adjustable to fold with respect to the seat bottom 12 in a manner known to those skilled in the art. In addition, the vehicle seat 10 may be adjustable and/or movable in a conventional manner, and the seat 10 may include a heating, cooling and/or ventilation system provided in an interior of the seat 10. An expanded view of a portion of an exterior surface of the seat 10 is shown in FIG. 2.

Figure 2:
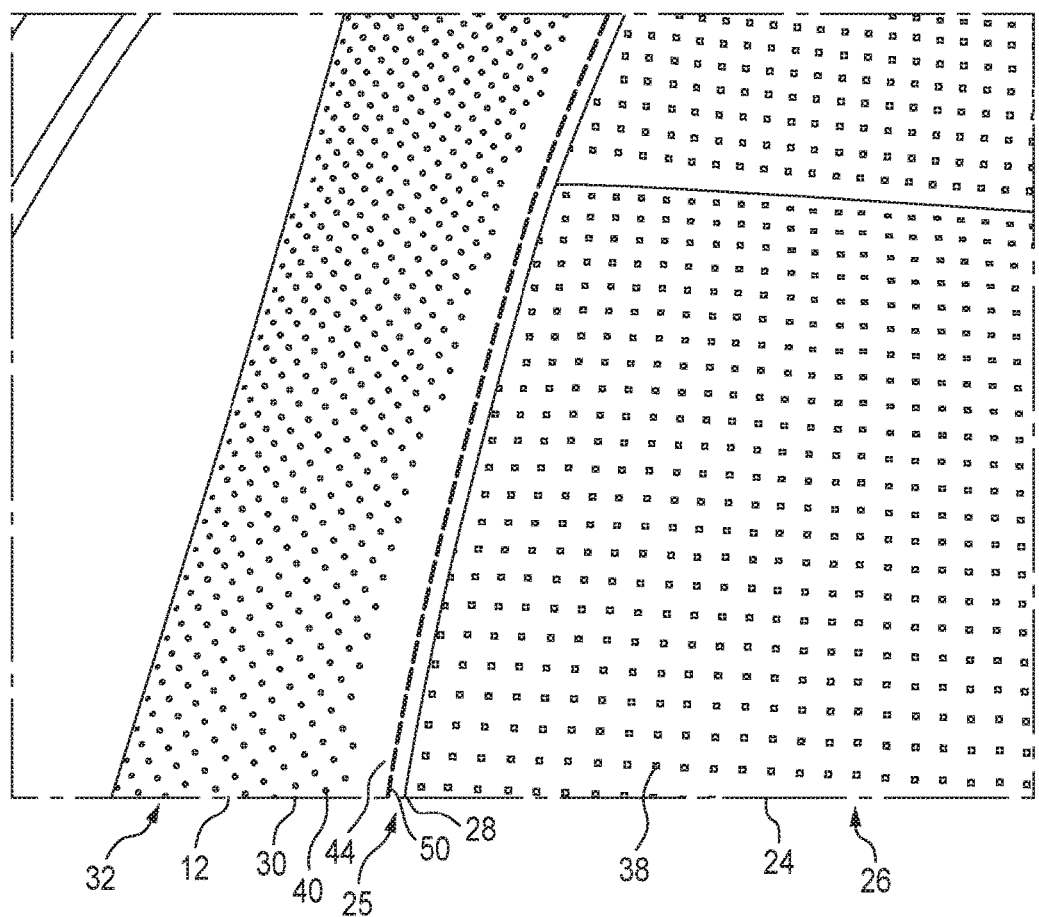
FIG. 2 is a view of a portion of the seat of FIG. 1.
Figure 4:
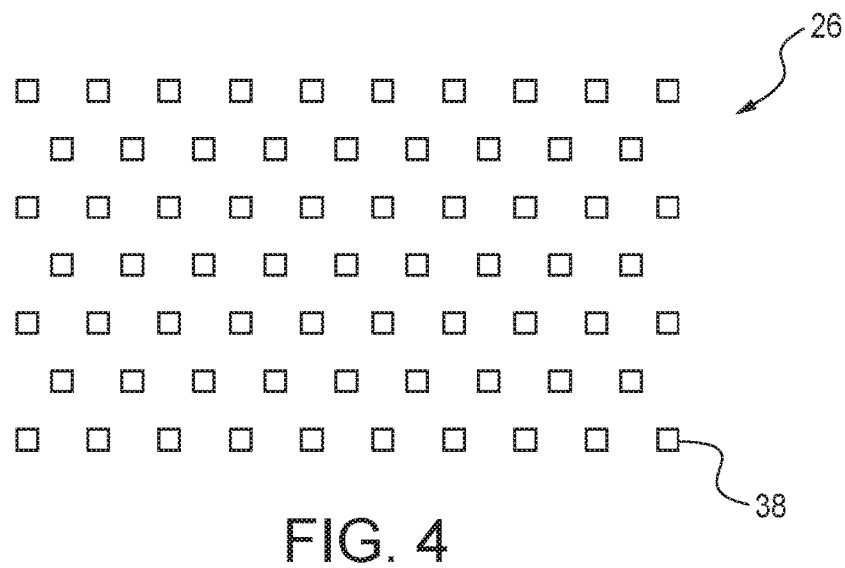
FIG. 4 is a top view of a first perforation configuration useful on portions of the seat of FIG. 1.

The seat bottom 12 may include a first covering 24 having perforations 38 in a first perforation configuration 26, as shown most clearly in FIGS. 2 and 4. The first perforation configuration 26 may be formed of an array of perforations 38 in a series of rows and columns. In one embodiment, the perforations 38 may be rectangular shaped. For example, the perforations 38 may be square shaped with side dimensions of 1.5 mm. The rows and columns of perforations 38 may be offset. For example, a distance between rows of perforations may be approximately 4.2 mm, and a distance between columns of perforations 38 may be approximately 5.2 mm such that the perforations 38 may be arranged in a pattern as shown most clearly in FIG. 4. However, it will be understood that alternative embodiments may have perforations of different sizes and shapes, and the perforations may be arranged in different perforation configurations having different dimensions within the scope of the present disclosure.

Figure 3:
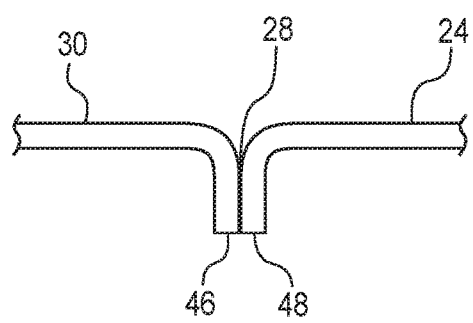
FIG. 3 is a cross-sectional view of a seam in the cover of the seat of FIG. 1.

The first covering 24 may be joined at a seam 28 to a second covering 30. A cross-sectional view of a portion of the seam 28 is shown in FIG. 3. The first covering 24 and the second covering 30 may be joined together at the seam 28 by stitching, adhesives or any other suitable method known to those skilled in the art. It will be understood that the first covering 24, the second covering 30 and other covering portions may be joined together to collectively form a seat covering 25 forming a surface of the seat bottom 12 and/or the seat back 20. In one embodiment, the first covering 24 and the second covering 30 may be formed of a sheet material, such as leather. However, it will be understood that other suitable materials such as suede, alcantara, vinyl, cloth or the like, may be used to form the first covering 24 and the second covering 30 within the scope of the present disclosure.

Figure 5:
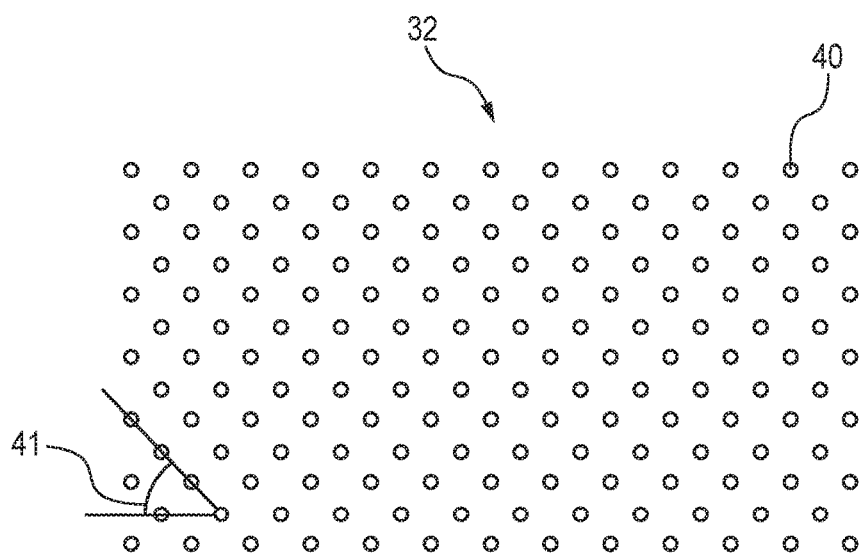
FIG. 5 is a top view of a second perforation configuration useful on portions of the seat of FIG. 1.

The second covering 30 may have perforations 40 in a second perforation configuration 32, as shown most clearly in FIGS. 2 and 5. The second perforation configuration 32 may be different from the first perforation configuration 26. For example, in one embodiment, the perforations 40 in the second perforation configuration 32 may be round, forming an opening diameter of approximately 1.1 mm. The second perforation configuration 32 may be formed of a series of rows and columns having a distance between rows of approximately 2.5 mm and a distance between columns of approximately 5.0 mm. The perforations 40 may be arranged such that a line of perforations 40 forms an angle 41, as shown in FIG. 5, with respect to a row of perforations in which the angle 41 is approximately 45 degrees. Again, it will be appreciated that the size and shape of the perforations 40 may be different in alternative embodiments, and the second perforation configuration 32 may have different dimensions and arrangements within the scope of the present disclosure.

The first covering 24 may have a first width 34 at the front side 14 of the seat bottom 12, and the width of the first covering 24 may widen to a second width 36 at the top side 16 of the rear portion 22 of the seat bottom 12. The first covering 24 may be joined to the second covering 30 on opposite sides of the seat 10 such that the first covering 24 is positioned in a central portion of the seat 10 and the second covering 30 is positioned laterally from both sides of the first covering 24. In one embodiment, the widening of the first covering 24 may be curved in a somewhat half hourglass shape. Alternatively, other shapes may be used within the scope of the present disclosure.

As discussed regarding the exemplary embodiment above, the first covering 24 may have rectangular shaped perforations 38, and the second covering 30 may have round perforations 40. Thus, the seat covering 25 may be provided with portions having different textural appearances. Moreover, the perforations 38, 40 may provide different characteristics for ventilation, heating or air conditioning used with the seat 10. Accordingly, portions requiring additional ventilation may utilize a perforation configuration that allows for greater air flow, whereas portions of the seat 10 that require less ventilation may utilize a perforation configuration that provides a lessor or no air flow. Accordingly, it will be understood that in different embodiments of the seat 10, different perforation characteristics and configurations may be used. It will also be understood that some portions of the seat covering 25 may be provided with no perforations.

The seat back 20 may include the first covering 24 extending in a central portion 42 of the seat back 20. The first covering 24 may narrow in width from the bottom of the seat back 20 toward an upper portion of the seat back 20. The seat back 20 may include the second covering 30 joined to the first covering 24 on opposite sides such that the first covering 24 is positioned in a central portion of the seat back 20 and the second covering 30 is positioned laterally on both sides of the first covering 24.

In one embodiment the first covering 24 may have a ratio of area of the perforations 38 to the surface area of the first covering 24 of approximately 0.1. in contrast, the second covering 30 may have a ratio of area of the perforations 40 to the surface area of the second perforation configuration 32 area of approximately 0.075. Thus, it will be appreciated that the perforation to surface area ratio of the first covering 24 may be greater than the perforation to surface area ratio of the second covering 30. The configuration of the first covering 24 in the seat may therefore be arranged to provide beneficial ventilation effects to the core of a person seated in the seat 10, whereas areas toward the lateral sides of the seat 10 may have reduced ventilation effects where they are not as beneficial.

In one embodiment, the second covering 30 may include a region 44 without perforations, shown most clearly in FIGS. 1 and 2, extending adjacent to and along an edge 46 of the second covering 30, shown most clearly in FIG. 3. In contrast, the perforations 38 in the first covering 24 may extend all the way to an edge 48 of the first covering 24. Forming the perforations 38 throughout the entire second covering 30 may simplify construction and provide a more economical covering. A line of stitching 50 may be provided in the second covering 30 in the region 44 between the perforations 40 and the seam 28. Placing the line of stitching 50 in the region 44 without perforations 40 allows the line of stitching 50 to be more durable and continuous without deformations caused by the perforations 40 to provide a more uniform and pleasant appearance. Placing stitching in perforated materials sometimes causes irregularities if the stitching is placed at or near a perforation, as the stitching may then be altered by the position of the perforation. Thus, the present arrangement of stitching, perforations and areas without perforations provides an economic covering with an improved appearance. It will be understood that the line of stitching 50 may be provided in multiple locations as shown in FIG. 1, including in the second covering 30 on both sides of the first covering 24 in the seat bottom 12 and the seat back 20.

In one embodiment, the line of stitching 50 may be comprised of individual stitches having a length of approximately 4-5 mm. The line of stitching 50 may be positioned in the region 44 without perforations, approximately 5-7 mm from the perforations and approximately 3-5 mm from the seam 28. Such configuration allows the line of stitching 50 to avoid interference with the perforations 40 and the seam 28, and also improves the visibility of the line of stitching 50. It will be understood that alternative embodiments may have different dimensions for the line of stitching and its position with respect to the seam 28 and the perforations 40.

A method is provided for producing a seat covering 25 for the seat 10, which includes providing a first covering 24 having a first perforation configuration 26 that extends to an edge 48 of the first covering 24. The method further includes providing a second covering 30 having a second perforation configuration 32 that terminates to define a region without perforations adjacent an edge 46 of the second covering 30. The method includes joining the edge 48 of the first covering 24 to the edge 46 of the second covering 30 at the seam 28, and providing a line of stitching 50 along the seam 28 in the region 44 without perforations.

A further method of producing a seat covering 25 is disclosed that includes providing a first covering 24 having a first perforation configuration 26, providing a second covering 30 having a second perforation configuration 32 that is different from the first perforation configuration 26. The method also includes joining the first covering 24 to the second covering 30 at a seam 28, and providing a line of stitching 50 along the seam 28.

The foregoing description of embodiments and examples has been presented for purposes of illustration and description. It is not intended to be exhaustive or to limit the invention to the forms described. Numerous modifications are possible in light of the above teachings. Some of those modifications have been discussed and others will be understood by those skilled in the art. The embodiments were chosen and described in order to best illustrate certain principles and various embodiments as are suited to the particular use contemplated. The scope of the invention is, of course, not limited to the examples or embodiments set forth herein, but can be employed in any number of applications and equivalent devices by those of ordinary skill in the art. Rather it is hereby intended the scope of the invention be defined by the claims appended hereto.

What is claimed is:

1. A seat comprising:
a seat bottom having a front side and a top side;
a seat back extending upwardly from a rear portion of the seat bottom;
the seat bottom comprising a first covering joined at a seam to a second covering, the first covering having a first width at the front side of the seat bottom, and widening to a second width at the rear portion of the seat bottom;
wherein the first covering has perforations in a first configuration and the second covering has perforations in a second configuration, the first configuration being different than the second configuration.

2. The seat of claim 1, wherein the first covering is joined to the second covering on opposite sides of the seat such that the first covering is positioned in a central portion of the seat and the second covering is positioned laterally from both sides of the first covering.

3. The seat of claim 1, wherein the perforations in the first covering are rectangular, and the perforations in the second covering are round.

4. The seat of claim 1, wherein a perforation to surface area ratio of the first covering is greater than a perforation to surface area ratio of the second covering.

5. The seat of claim 1, wherein the seat back comprises the first covering extending in a central portion of the seat back.

6. The seat of claim 5, wherein the first covering narrows in width from the bottom of the seat back toward an upper portion of the seat back.

7. The seat of claim 6, wherein the seat back comprises the second covering joined to the first covering on opposite sides such that the first covering is positioned in a central portion of the seat back and the second covering is positioned laterally from both sides of the first covering.

8. The seat of claim 1, further comprising a region without perforations in the second covering adjacent the seam.

9. The seat of claim 8, wherein the perforations of the first covering extend to the seam.

10. The seat of claim 9, further comprising a line of stitching in the second covering in the region between the perforations and the seam.

11. A seat covering comprising:
a first covering having perforations in a first configuration that extends to an edge of the first covering;
a second covering having perforations in a second configuration that terminates to define a region without perforations adjacent an edge of the second covering;
a seam joining the edge of the first covering to the edge of the second covering; and
a line of stitching along the seam in the region without perforations.

12. The seat covering of claim 11, wherein the perforations in the first covering are rectangular, and the perforations in the second covering are round.

13. The seat covering of claim 11, wherein the first covering is joined to the second covering on opposite sides of a seat such that the first covering is positioned in a central portion of the seat and the second covering is positioned laterally from both sides of the first covering.

14. The seat covering of claim 13, the first covering having a first width at a front side of the seat, and widening to a second width at a rear portion of the seat, and wherein the first covering narrows in width from a bottom of a seat back toward an upper portion of the seat back.

* * * * *